(12) United States Patent
Mulani et al.

(10) Patent No.: US 12,675,363 B2
(45) Date of Patent: Jul. 7, 2026

(54) TECHNIQUES FOR IMPROVED DATA TRANSFER

(71) Applicant: Micron Technology, Inc., Boise, ID (US)

(72) Inventors: Jameer Mulani, Bangalore (IN); Amiya Banerjee, Bangalore (IN); Nitul Gohain, Bangalore (IN)

(73) Assignee: Micron Technology, Inc., Bosie, ID (US)

( * ) Notice: Subject to any disclaimer, the term of this patent is extended or adjusted under 35 U.S.C. 154(b) by 235 days.

(21) Appl. No.: 18/397,889

(22) Filed: Dec. 27, 2023

(65) Prior Publication Data

US 2024/0232011 A1 Jul. 11, 2024

Related U.S. Application Data

(60) Provisional application No. 63/478,537, filed on Jan. 5, 2023.

(51) Int. Cl.
| | |
|---|---|
| *G06F 11/10* | (2006.01) |
| *G06F 11/00* | (2006.01) |
| *G06F 13/16* | (2006.01) |
| *H03M 13/00* | (2006.01) |

(52) U.S. Cl.
CPC ...... *G06F 11/1068* (2013.01); *G06F 11/1048* (2013.01); *G06F 13/1673* (2013.01)

(58) Field of Classification Search
CPC ............. G06F 13/1673; G06F 11/1068; G06F 11/1048
See application file for complete search history.

(56) References Cited

U.S. PATENT DOCUMENTS

| | | | | |
|---|---|---|---|---|
| 9,513,991 | B2 * | 12/2016 | Rho | G06F 11/1048 |
| 9,619,321 | B1 * | 4/2017 | Haratsch | G06F 3/064 |
| 9,990,163 | B2 * | 6/2018 | Cha | G06F 11/106 |
| 10,691,533 | B2 * | 6/2020 | Kwak | G11C 29/52 |
| 11,061,769 | B2 * | 7/2021 | Yu | G11C 29/52 |
| 11,163,640 | B2 * | 11/2021 | Eun | G11C 11/4093 |
| 11,321,167 | B2 * | 5/2022 | Sharon | G11C 16/10 |
| 11,756,643 | B2 * | 9/2023 | Jang | G11C 29/44 |
| | | | | 365/185.09 |
| 2013/0145234 | A1 * | 6/2013 | Yoon | G06F 11/1008 |
| | | | | 714/773 |

* cited by examiner

*Primary Examiner* — Justin R Knapp

(74) *Attorney, Agent, or Firm* — Holland & Hart LLP

(57) ABSTRACT

Methods, systems, and devices for techniques for improved data transfer are described. As part of a data transfer operation from a first set of memory cells of a memory device to a second set of memory cells of the memory device, a memory controller of may read a set of data units from the first set of memory cells. The memory device 240 may transmit the set of data units to the memory controller. The memory controller may decode the set of data units, and, in some cases, may generate one or more corrected data units. The memory controller may then generate parity information for the set of data units, and may encode and write the parity information, along with any corrected data units, to the second set of memory cells of the memory device without transferring the uncorrected data units.

20 Claims, 6 Drawing Sheets

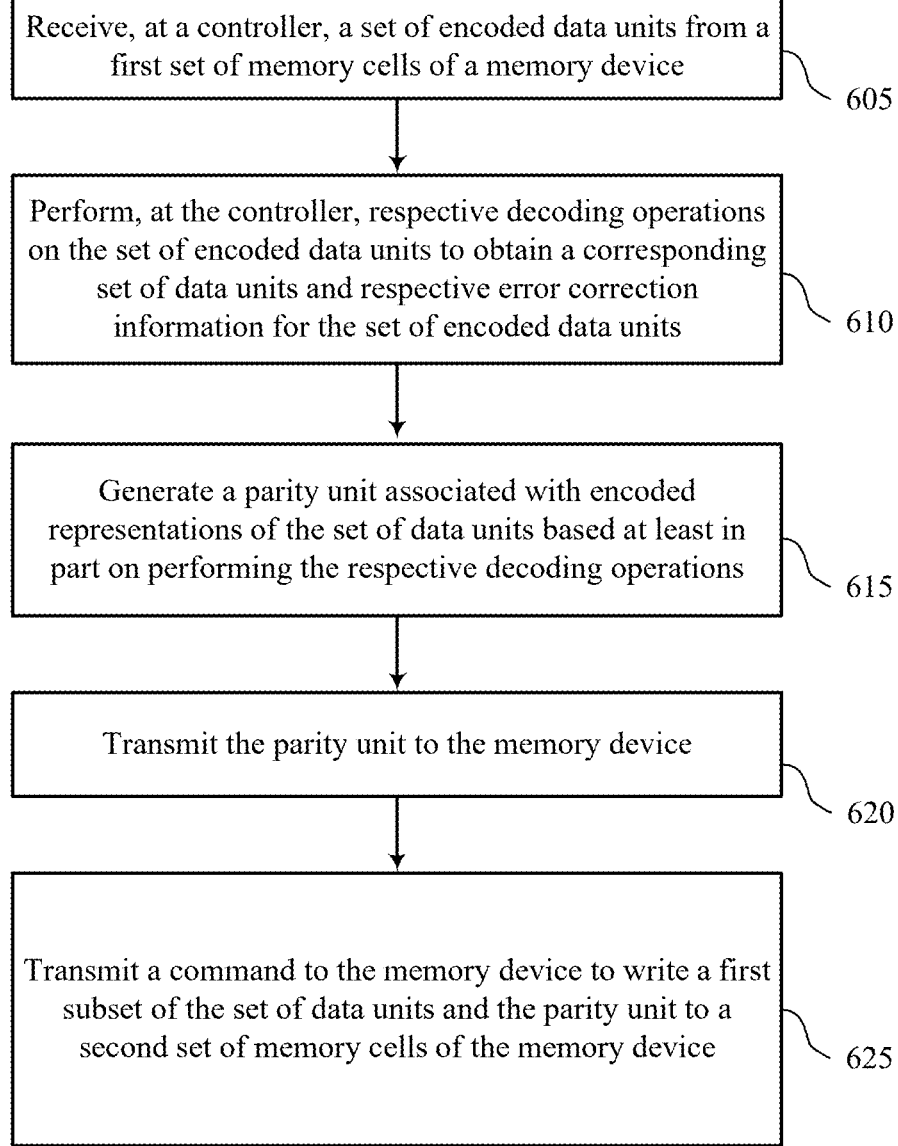

Receive, at a controller, a set of encoded data units from a first set of memory cells of a memory device

605

Perform, at the controller, respective decoding operations on the set of encoded data units to obtain a corresponding set of data units and respective error correction information for the set of encoded data units

610

Generate a parity unit associated with encoded representations of the set of data units based at least in part on performing the respective decoding operations

615

Transmit the parity unit to the memory device

620

Transmit a command to the memory device to write a first subset of the set of data units and the parity unit to a second set of memory cells of the memory device

TECHNIQUES FOR IMPROVED DATA TRANSFER

CROSS REFERENCE

The present Application for Patent claims priority to U.S. Patent Application No. 63/478,537 by Mulani et al., entitled "TECHNIQUES FOR IMPROVED DATA TRANSFER," filed Jan. 5, 2023, which is assigned to the assignee hereof, and which is expressly incorporated by reference herein.

FIELD OF TECHNOLOGY

The following relates to one or more systems for memory, including techniques for improved data transfer.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIG. 6 shows a flowchart illustrating a method or methods that support techniques for improved data transfer in accordance with examples as disclosed herein.

DETAILED DESCRIPTION

Figure 1:
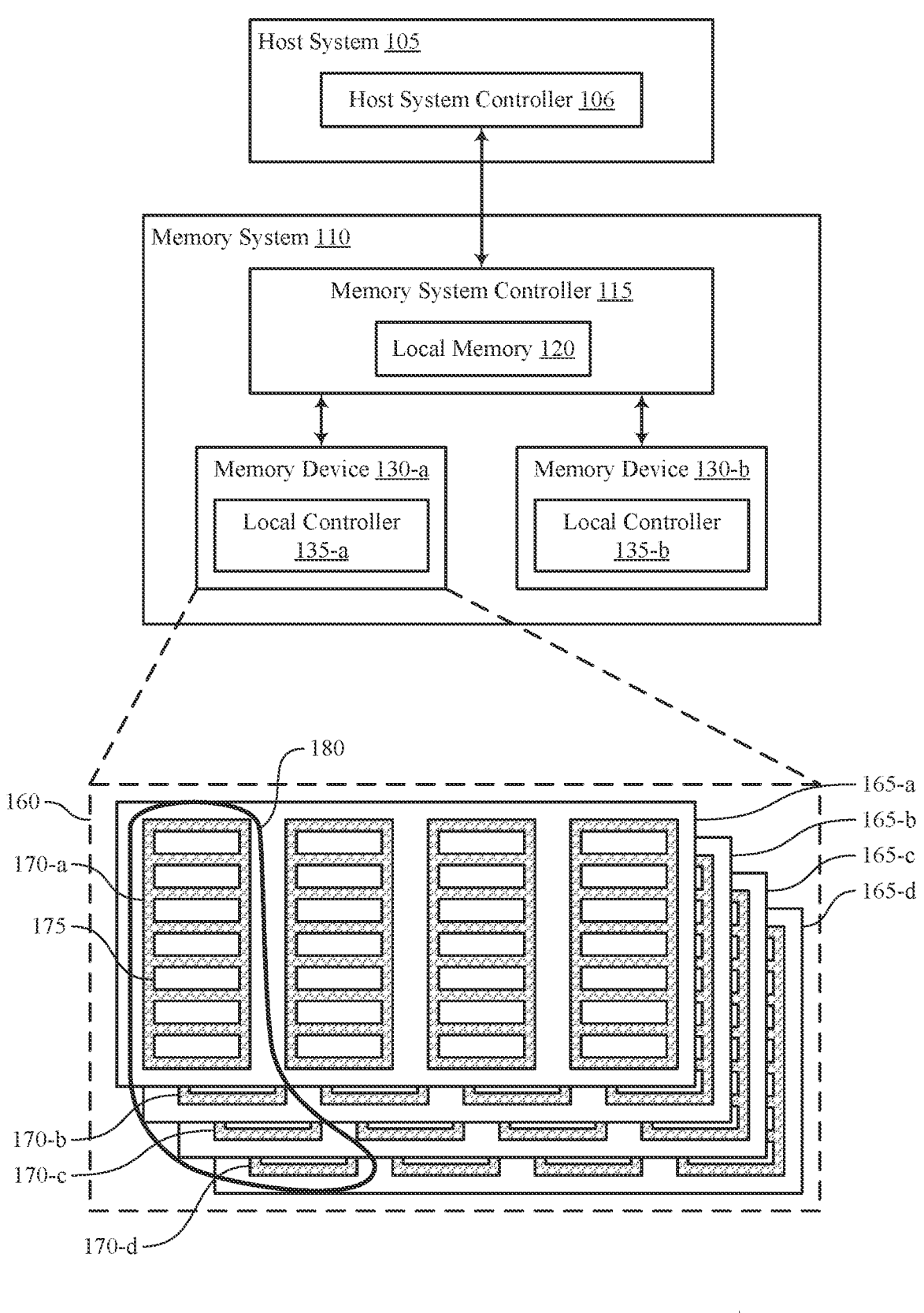
FIG. 1 illustrates an example of a system that supports techniques for improved data transfer in accordance with examples as disclosed herein.

In some cases, a memory device (e.g., Not-AND (NAND) memory device) may include memory cells configured to each store one bit of information, which may be referred to as single level cells (SLCs). Additionally, or alternatively, a memory device may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, as penta-level cells (PLCs) if configured to each store five bits of information, or more generically as multiple-level memory cells. Multiple-level memory cells may provide greater density of storage relative to SLC memory cells but may, in some cases, involve narrower read or write margins or greater complexities for supporting circuitry.

Some memory systems may include multiple layers of error correction codes for data stored to sets of memory cells storing multiple bits and associated with weak word lines. Such memory cells may be associated with a higher probability of memory errors during a read or write operation (e.g., memory cells associated with a weak word line may produce bit errors more frequently than word lines in other cells). Accordingly, as part of a data transfer operation to transfer data from a source set of memory cells, such as SLC blocks, TLC blocks, QLC blocks, or PLC blocks, to a destination QLC or PLC block associated with a weak word line, some memory systems may transfer the data from the source set of memory cells of a memory device to an associated memory controller. The memory controller may detect or correct errors in the data using first parity information included in the data. Further, the memory controller may generate additional parity information to provide added protection, and may transfer the data, along with the additional parity information, back to the memory device, which may store the data and the parity information in the destination set of memory cells. However, such implementations may cause additional overhead costs (e.g., increased power consumption from transferring data back to the memory device, increased latency) and may cause decreased overall performance. Such implementations may also use larger memory buffers (e.g., a buffer on the memory controller) to hold source data while data and parity information is prepared to transfer to the memory device. Accordingly, techniques to improve memory device data transfers, and error detection and correction during such transfers, are desired As described herein, as part of a data transfer operation from a first set of memory cells to a second set of memory cells associated with a weak word line, a memory controller may read one or more data units from the first set of memory cells. In some cases, the memory device may store a copy of the one or more data units in a set of latches, and may transmit the set of data units to the memory controller. The memory controller may decode the set of data units, and, if the memory controller detects and corrects an error, may generate one or more corrected data units. The memory controller may then generate parity information for the set of data units, and may encode and transmit the parity information, along with any corrected data units (e.g., without transferring the uncorrected data units), to the memory device. The memory device may update the set of latches to include any corrected data units, and may store the set of data units written to the latches in the second set of memory cells. Such a process may reduce traffic memory space used to perform data transfer operations, which may improve efficiency of the memory system.

Figure 2:
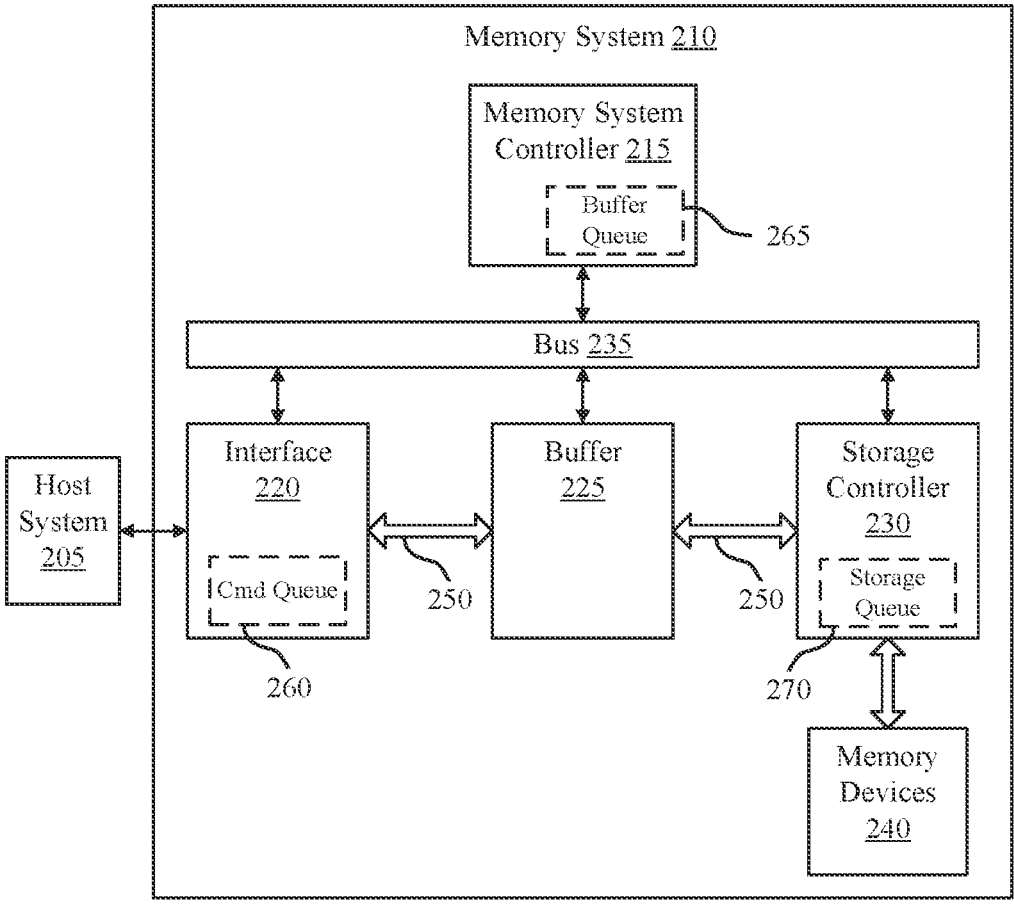
FIG. 2 illustrates an example of a system that supports techniques for improved data transfer in accordance with examples as disclosed herein.

Features of the disclosure are initially described in the context of systems, devices, and circuits with reference to FIGS. 1 through 2. Features of the disclosure are described in the context of systems with reference to FIGS. 3 through 4. These and other features of the disclosure are further illustrated by and described in the context of an apparatus diagram and flowchart that relate to techniques for improved data transfer with reference to FIGS. 5 through 6.

FIG. 1 illustrates an example of a system 100 that supports techniques for improved data transfer in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory. Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support techniques for improved data transfer. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some cases, as part of a data transfer operation from a first set of memory cells of a memory device 130-*a* to a second set of memory cells of the memory device 130-*a* associated with a weak word line, a memory system controller 115 of the memory system 110 may read one or more data units (e.g., corresponding to one or more pages 175) from the first set of memory cells. In some cases, the memory device 130-*a* may store a copy of the one or more data units in a set of latches (e.g., a set of latches of the local controller 135-*a*), and may transmit the set of data units to the memory system controller 115. The memory system controller 115 may decode the set of data units, and, if the memory system controller 115 detects and corrects an error, may generate one or more corrected data units. The memory system controller 115 may then generate parity information for the set of data units, and may encode and transmit the parity information, along with any corrected data units (e.g., without transferring the uncorrected data units), to the memory device 130-*a*. The memory device 130-*a* may update the set of latches to include any corrected data units, and may store the set of data units written to the latches in the second set of memory cells. Such a process may reduce traffic memory space used to perform data transfer operations, which may improve efficiency of the memory system 110.

FIG. 2 illustrates an example of a system 200 that supports techniques for improved data transfer in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some cases, as part of a data transfer operation from a first set of memory cells of a memory device 240 to a second set of memory cells of the memory device 24 associated with a weak word line, a memory system controller 215 of the memory system 210 may read one or more data units from the first set of memory cells. In some cases, the memory device 240 may store a copy of the one or more data units in a set of latches, and may transmit the set of data units to the memory system controller 215. The memory system controller 215 may decode the set of data units, and, if the memory system controller 215 detects and corrects an error, may generate one or more corrected data units. The memory system controller 215 may then generate parity information for the set of data units, and may encode and transmit the parity information, along with any corrected data units (e.g., without transferring the uncorrected data units), to the memory device 240. The memory device 240 may update the set of latches to include any corrected data units, and may store the set of data units written to the latches in the second set of memory cells. Such a process may reduce traffic memory space used to perform data transfer operations, which may improve efficiency of the memory system 210.

Figure 3:
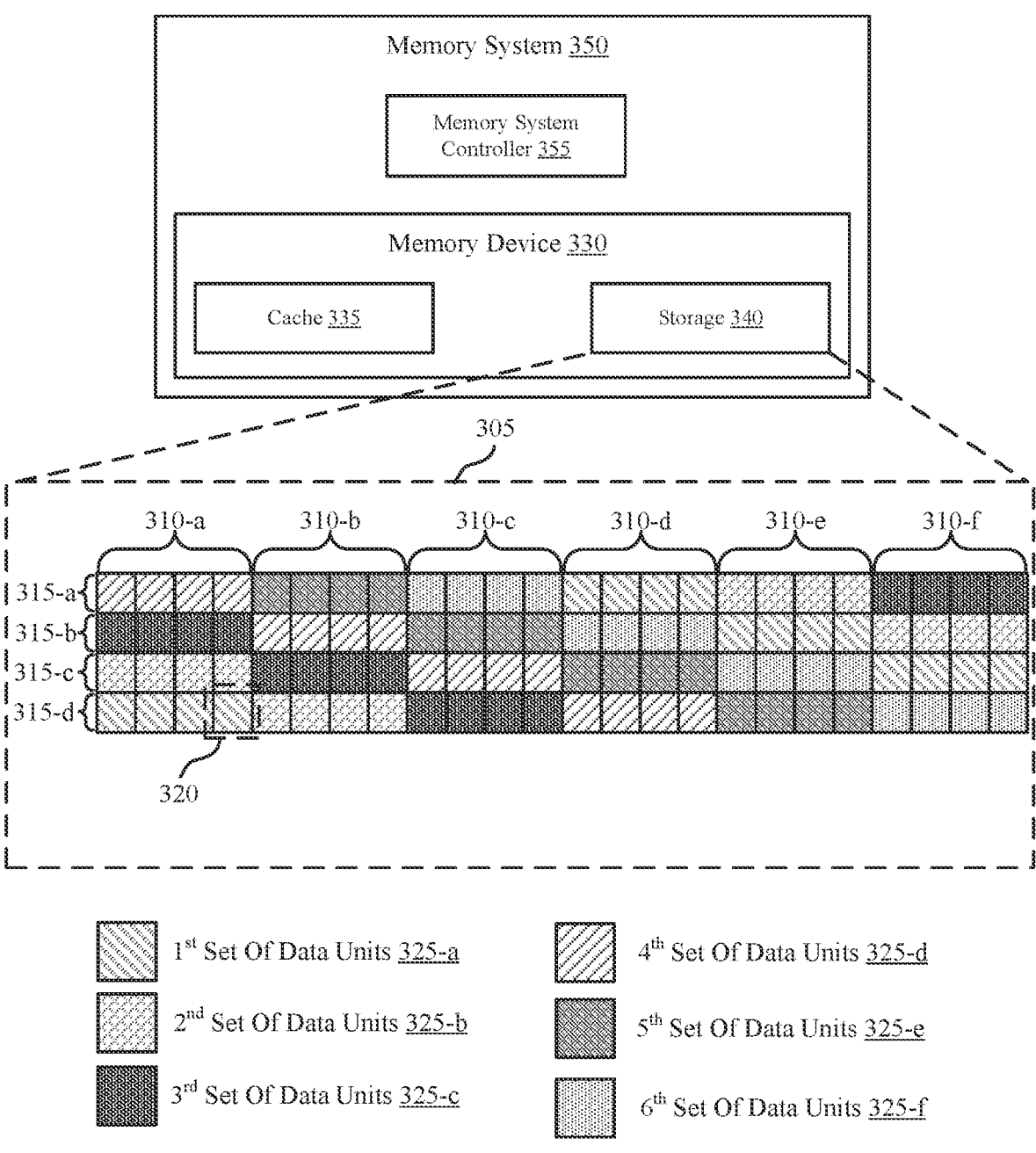
FIG. 3 illustrates an example of a system that supports techniques for improved data transfer in accordance with examples as disclosed herein.

FIG. 3 illustrates an example of a system 300 that supports techniques for improved data transfer in accordance with examples as disclosed herein. The system 300 may include a memory device 330, which may be an example of a memory device 130 or a memory device 240, as described with reference to FIGS. 1 and 2. In some cases, the memory device 330 may include one or more sets of memory cells, which may be used to store data received from a host system, such as the host system 105 or the host system 205.

For example, the memory device 330 may be integrated within a memory system 350, which may be configured to store data received from a host system. The memory system 350 may include a memory system controller 355, which may transmit data received from the host system to the memory device 330. The memory device 330 may include a set of memory cell as part of a cache 335, which may store data received from the memory system controller 355 (e.g., as part of a write command). In some cases, the memory cells of the cache 335 may include memory cells that each store a single bit of data (e.g., the cache 335 may include one or more SLC blocks), which may improve speed and reliability of performing write commands from the host. In some examples, as the cache 335 becomes full or nearly full (e.g., if the amount of data stored in the cache 335 exceeds a threshold), the system 300 may initiate a data transfer operation to transfer data from the cache 335 to a second set of memory cells, such as a storage 340. The storage 340 may include memory cells that each store multiple bits of data, such as four bits of data or five bits of data (e.g., the storage 340 may include one or more QLC or PLC blocks), which may free storage space within the cache 335. In some examples, such a data transfer operation may be referred to as a folding operation. Additionally or alternatively, the system 300 may transfer data to the storage 340 as part of other data management operations, such as a garbage collection operation. For example, the system 300 may transfer data to the storage 340 from one or more blocks of memory cells, such as one or more SLC blocks, one or more MLC blocks, one or more TLC blocks, one or more QLC blocks, one or more PLC blocks, or any combination thereof.

In some cases, memory cells of the storage 340 may be associated with a smaller read margin than memory cells of the cache 335 (e.g., due to the memory cells of the storage 340 storing more bits than the memory cells of the cache 335). Accordingly, data stored in the storage 340 may include additional parity information to improve data reliability. For example, if the storage 340 includes memory cells coupled with a weak word line, data stored in those memory cells may include additional parity information compared with data stored in memory cells not coupled with a weak word line.

A weak word line may include or may refer to a word line having a physical characteristic associated with increased bit error rates, such as a word line that is located at an edge of a memory array. Additionally or alternatively, weak word lines may be word lines identified as having defects, such as mechanical defects caused during manufacturing or other conditions which may increase the likelihood of errors in data associated with the weak word line. In some cases, weak word lines of a memory device 330 may be identified during manufacturing, such as during a testing phase, and an indication of the weak word lines (e.g., an address) may be stored in the system 300. Additionally, the system 300 may not support transferring data directly from the cache 335 to the memory cells associated with a weak word line of the storage 340 (e.g., may not support an internal copyback operation), for example due to an increased likelihood for error from cross-temperature read (e.g., reading data from memory cells at a temperature to which data was written at a substantially different temperature) or high temperature transfers, or because the system 300 may not be configured to perform an internal copyback.

Instead, to transfer data from a first set of memory cells of the cache 335 to a second set of memory cells of associated with a word line 305 of the storage 340 (e.g., a weak word line), the memory device 330 may transfer one or more sets of data units, such as the sets of data units 325-*a* through 325-*f* from the cache 335 to a memory controller. The memory controller may perform an error correction operation, such as a decoding operation, on each data unit of the set of data units 325 to determine whether the data units contain errors, and correct at least a portion of detected errors. Further, the memory controller may generate parity information 320 for the set of data units 325 and transfer the parity information 320, along with any corrected data units, to the memory device 330 to store the set of data units 325 and the parity information 320 in the second set of memory cells of the storage 340.

In some cases, the word line 305 may store one or more sets of data units 325 across a set of planes 310, such as the planes 310-*a* through 310-*f*. The set of planes 310 may include memory cells having multiple levels, such as memory cells of a QLC block having a first level 315-*a*, a second level 315-*b*, a third level 315-*c*, and a fourth level 315-*d*, a set of data units may be distributed across the set of planes 310 on a word line. In some examples, a set of data units 325, along with the corresponding parity information 320, may be stored across multiple planes 310, as illustrated in FIG. 3. Additionally or alternatively, the set of data units 325 and associated parity information 320 may be stored in a single plane 310.

Although the example described with reference to FIG. 3 may use memory cells of a QLC block as an illustrative example, one skilled in the art may appreciate that the techniques described herein may be similarly applied to memory cells which store any quantity of levels (e.g., SLC blocks, MLC blocks, TLC blocks, QLC blocks, PLC blocks, and so on).

Figure 4:
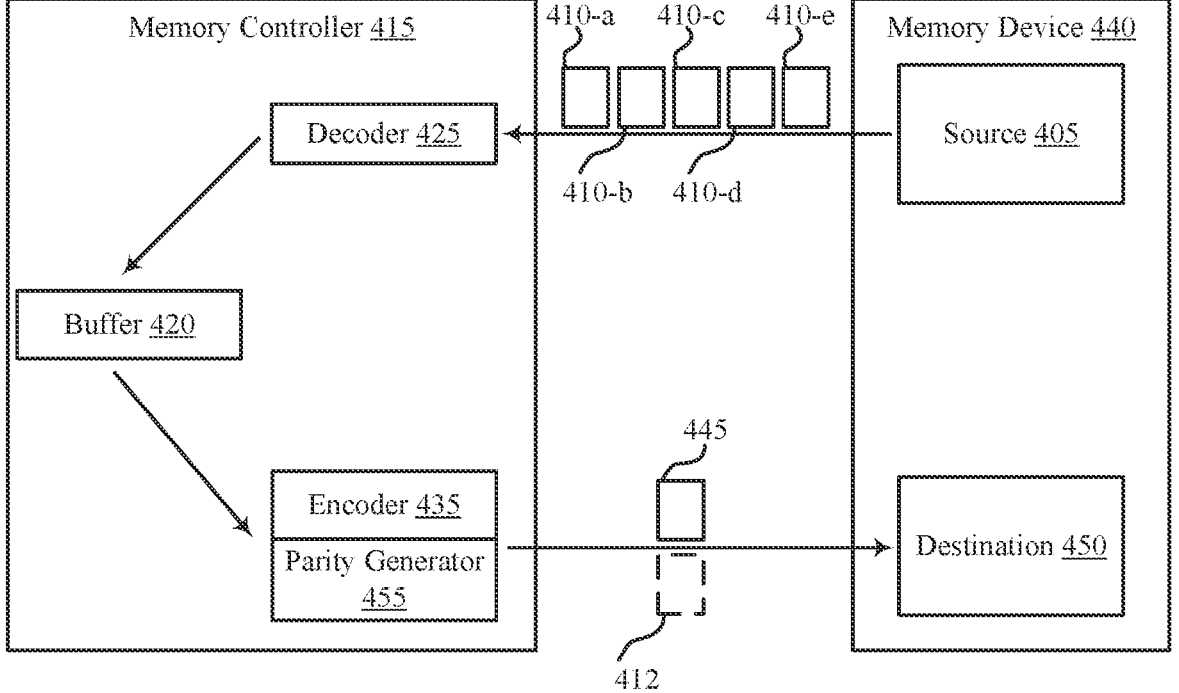
FIG. 4 illustrates an example of a system that supports techniques for improved data transfer in accordance with examples as disclosed herein.

FIG. 4 illustrates an example of a system 400 that supports techniques for improved data transfer in accordance with examples as disclosed herein. The system 400 may include a memory device 440 and a memory controller 415, which may be examples of the corresponding devices as described with reference to FIGS. 1 through 3. The memory controller 415 may include a buffer 420, a decoder 425, an encoder 435, and a parity generator 455. The memory controller 415 and the memory device 440 may support communication of various data units containing parity information, codeword data, or any combination thereof.

As part of a data transfer operation (e.g., a folding operation, a garbage collection operation), the memory controller 415 may determine to transfer a set of data units, such as the data units 410-a through 410-e, from a source set of memory cells 405 to a destination set of memory cells 450. If the memory controller 415 determines that the destination set of memory cells 450 is associated with a weak word line, the memory controller 415 may transmit a command (e.g., a read command) to the memory device 440 to retrieve the data units 410-a through 410-e. Upon receiving the command, the memory device 440 may transmit the data units 410-a through 410-e from the source set of memory cells 405 to the memory controller 415. In some cases, prior to transmitting the data units, the memory device 440 may store the data units 410 one or more latches of the memory device 440, and may retain the data units 410 after transmitting the data units to the memory controller 415.

In some examples, data units stored in the memory device 440 may be encoded and stored as codewords (e.g., using an encoding or error correction scheme, such as a low density parity check (LDPC) scheme). Accordingly, upon receiving the set of encoded data units 410, the memory controller 415 may initiate a decoding process on the set of encoded data units 410 using the decoder 425. As part of the decoding process, the memory controller 415 may perform an LDPC decoding procedure. For example, the decoder 425 may decode each data unit (e.g., using a sparse parity-check matrix used to define the codewords), which may allow the decoder 425 to detect errors, correct errors, or both using parity data included in the received codewords. If the decoder 425 corrects an error or a threshold quantity of errors, the decoder 425 may generate one or more corrected data units, such as the corrected data unit 412.

The memory controller 415 may issue and store the set of decoded data units 410, and in cases in which the decoder 425 corrected at least one error, the one or more corrected data units, to the buffer 420. In some cases, the decoded data units 410 may remain in the buffer until the encoder 435 and the parity generator 455 are available.

The memory controller 415 may transfer the decoded set of data units 410, including the corrected data unit 412, if generated by the decoder 425, from the buffer 420 to the encoder 435 to encode the set of data units 410 and the corrected data unit 412, if present, to obtain encoded representations of the set of data units 410 (e.g., the original encoded data units 410 and/or any reencoded data units generated from the corrected data units 412). The parity generator 455 may perform an error control procedure to generate parity information 445 (e.g., dynamic exclusive-or (XOR) parity information) associated with the encoded set of data units 410. In some examples, the encoder 435 may additionally encode the parity information 445.

In some cases, such as if the decoder 425 did not correct an error in the set of data units 410, the memory controller 415 may transmit the parity information 445 to the memory device 440, and may store the parity information 445 in a latch of the memory device 440. In such cases, the memory controller 415 may not transmit data units 410 to the memory device. Additionally or alternatively, if the decoder generated the corrected data unit 412, the memory controller 415 may optionally transmit the encoded corrected data unit 412 to the memory device 440. Upon receiving the corrected data unit 412, the memory device 440 may store the corrected data unit 412 in a latch, such as by overwriting the corrected data unit 412 to the latch which held the data unit 410 in which the decoder 425 corrected an error. In such cases, latches storing data units 410 in which the decoder 425 did not correct an error may not be overwritten (e.g., the latches may retain their respective data units 410). Alternatively, the memory device 440 may store the corrected data unit 412 in a separate latch.

The memory controller 415 may transmit a command (e.g., a QLC program command) to write the data units 410, including data units which have been corrected (e.g., the corrected data unit 412, an encoded representation of the corrected data unit 412), and the parity information 445 from the set of latches of the memory device 440 to the destination set of memory cells 450. In some cases, the command may include an indication of respective addresses of latches from which to transfer the encoded representation of the set of data units 410 to the destination set of memory cells.

In some examples, the source set of memory cells 405 may be associated with (e.g., may be coupled with) a weak word line. Is such cases, the data units 410 may include a data unit comprising parity information (e.g., parity information generated as part of an earlier data transfer operation using the parity generator 455). Accordingly, the data unit comprising parity information may be overwritten (e.g., replaced) with the parity information 445. Additionally or alternatively, if the source set of memory cells 405 is not associated with a weak word line, then the parity information 445 may added to the set of data units 410. As an illustrative example, if the destination set of memory cells 450 (e.g., pages associated with a weak word line) has a capacity of 16 data units, the memory controller 415 may read 15 data units 410 from the source set of memory cells 405 (e.g., from a same word line, from more than one word line). The memory controller 415 may generate the parity information 445 using the 15 data units 410, and may transmit the parity information 445, as well as corrected data units 412, if present, to the memory device 440 to write the received data units, as well as uncorrected data units 410 stored in one or more latches, to the destination set of memory cells. Accordingly, the party information 445 may use a fraction of the capacity of the destination set of memory cells 450 (e.g., $\frac{1}{16}$ of the capacity of the destination set of memory cells 450). Although an example of 15 data units 410 was used, those skilled in the art may appreciated that other quantities are possible.

Upon receiving the command, the memory device 440 may store the set of data units 410 and the parity information 445 to one or more planes on the destination set of memory cells 450. In some cases, the memory device 440 may store the set of data units 410 and the parity information 445 across multiple planes of the destination set of memory cells 450, as described with reference to FIG. 3. Additionally or alternatively, the memory device 440 may store the set of data units 410 and the parity information 445 across a single plane of the destination set of memory cells 450.

Figure 5:
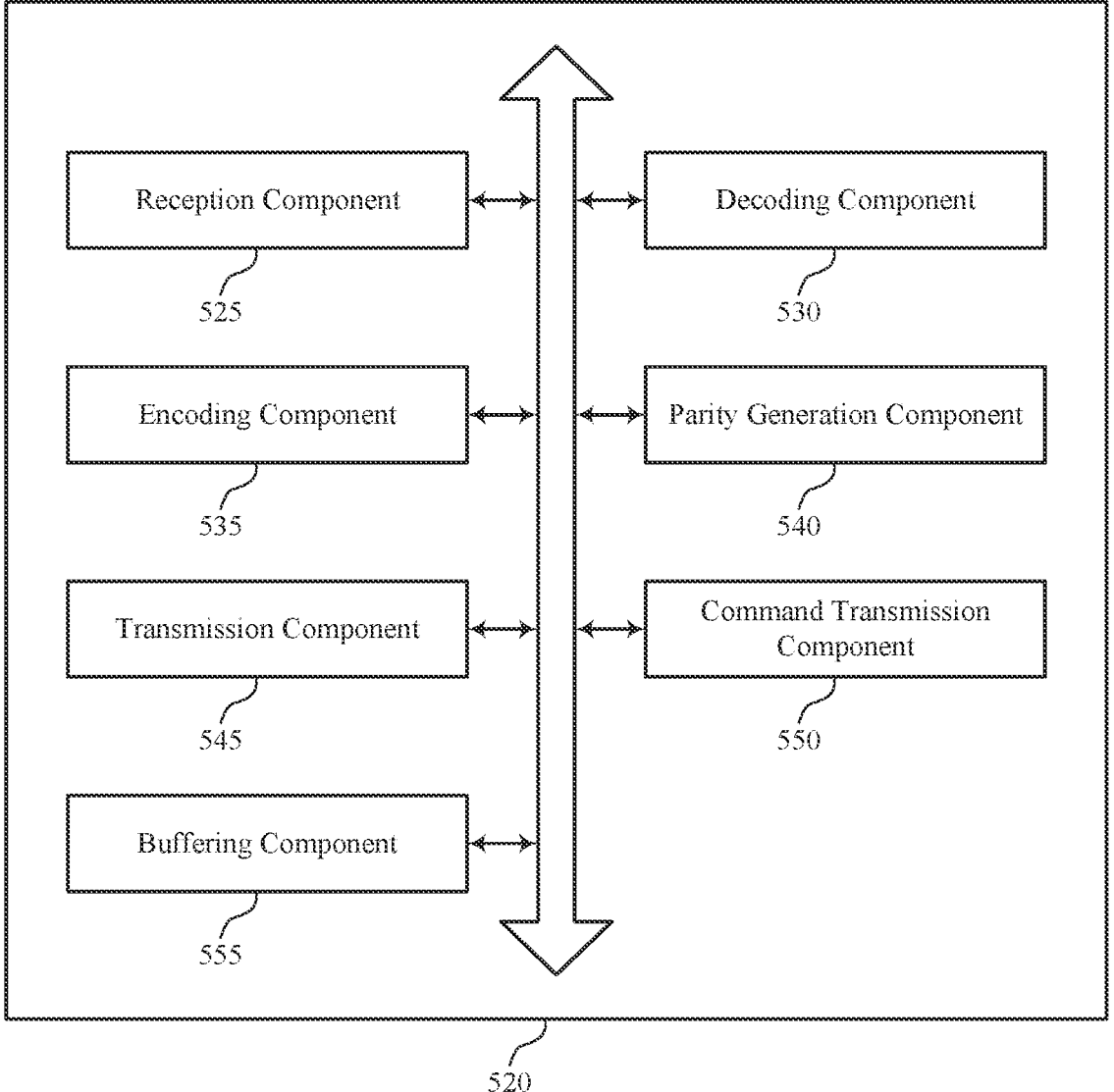
FIG. 5 shows a block diagram of a managed memory system controller that supports techniques for improved data transfer in accordance with examples as disclosed herein.

FIG. 5 shows a block diagram 500 of a managed memory system controller 520 that supports techniques for improved data transfer in accordance with examples as disclosed herein. The managed memory system controller 520 may be an example of aspects of a managed memory system controller as described with reference to FIGS. 1 through 4. The managed memory system controller 520, or various components thereof, may be an example of means for performing various aspects of techniques for improved data transfer as described herein. For example, the managed memory system controller 520 may include a reception component 525, a decoding component 530, an encoding component 535, a parity generation component 540, a transmission component 545, a command transmission component 550, a buffering component 555, or any combination thereof. Each of these components may communicate, directly or indirectly, with one another (e.g., via one or more buses).

The reception component 525 may be configured as or otherwise support a means for receiving, at a controller, a set of encoded data units from a first set of memory cells of a memory device. The decoding component 530 may be configured as or otherwise support a means for performing, at the controller, respective decoding operations on the set of encoded data units to obtain a corresponding set of data units and respective error correction information for the set of encoded data units. The encoding component 535 may be configured as or otherwise support a means for encoding a first subset of the set of data units based at least in part on the respective error correction information for the first subset of the set of data units to obtain one or more reencoded data units. The parity generation component 540 may be configured as or otherwise support a means for generating a parity unit associated with encoded representations of the set of data units based at least in part on performing the respective decoding operations. The transmission component 545 may be configured as or otherwise support a means for transmitting the one or more reencoded data units and the parity unit to the memory device. The command transmission component 550 may be configured as or otherwise support a means for transmitting a command to the memory device to write the one or more reencoded data units, a second subset of the set of data units, and the parity unit to a second set of memory cells of the memory device, where the second subset of the set of data units is exclusive of the first subset of the set of data units.

In some examples, to support transmitting the one or more reencoded data units and the parity unit, the transmission component 545 may be configured as or otherwise support a means for suppressing transmitting the second subset of the set of data units to the memory device.

In some examples, the command includes a latch address associated with a subset of a set of latches of the memory device, and the subset of the set of latches corresponds to the first subset of the set of data units.

In some examples, the buffering component 555 may be configured as or otherwise support a means for storing, based at least in part on performing the respective decoding operations, the set of data units in a buffer of the controller, where generating the parity unit is based at least in part on the storing.

In some examples, the reception component 525 may be configured as or otherwise support a means for receiving, at the controller, a second set of encoded data units from a third set of memory cells of the memory device. In some examples, the decoding component 530 may be configured as or otherwise support a means for performing, at the controller, respective decoding operations on the second set of encoded data units to obtain a corresponding second set of data units. In some examples, the parity generation component 540 may be configured as or otherwise support a means for generating a second parity unit associated with the second set of data units based at least in part on performing the respective decoding operations. In some examples, the transmission component 545 may be configured as or otherwise support a means for transmitting the parity unit to the memory device. In some examples, the command transmission component 550 may be configured as or otherwise support a means for transmitting a second command to the memory device to write the second set of encoded data units and the panty unit to a fourth set of memory cells of the memory device.

In some examples, a first data unit of the set of data units is associated with a first plane of the first set of memory cells and a second data unit of the set of data units is associated with a second plane of the first set of memory cells different than the first plane.

In some examples, the command transmission component 550 may be configured as or otherwise support a means for transmitting, to the memory device and as part of a memory management operation to transfer the set of encoded data units from the first set of memory cells to the second set of memory cells, a second command to retrieve the set of encoded data units, where receiving the set of encoded data units is based at least in part on transmitting the second command.

In some examples, the decoding component 530 may be configured as or otherwise support a means for determining that the second set of memory cells is associated with a word line of a set of word lines of the memory device, where transmitting the parity unit is based at least in part on the determining.

In some examples, the set of word lines includes word lines of the memory device not satisfying a performance threshold.

In some examples, each encoded data unit of the set of encoded data units includes respective parity information associated with a first type of error correction and the parity unit is associated with a second type of error correction different than the first type.

In some examples, each memory cell of the first set of memory cells stores one bit of data, two bits of data, three bits of data, or four bits of data, and each memory cell of the second set of memory cells stores four bits of data.

FIG. 6 shows a flowchart illustrating a method 600 that supports techniques for improved data transfer in accordance with examples as disclosed herein. The operations of method 600 may be implemented by a managed memory system controller or its components as described herein. For example, the operations of method 600 may be performed by a managed memory system controller as described with reference to FIGS. 1 through 5. In some examples, a managed memory system controller may execute a set of instructions to control the functional elements of the device to perform the described functions. Additionally, or alternatively, the managed memory system controller may perform aspects of the described functions using special-purpose hardware.

At 605, the method may include receiving, at a controller, a set of encoded data units from a first set of memory cells of a memory device. The operations of 605 may be performed in accordance with examples as disclosed herein. In some examples, aspects of the operations of 605 may be performed by a reception component 525 as described with reference to FIG. 5.

At 610, the method may include performing, at the controller, respective decoding operations on the set of encoded data units to obtain a corresponding set of data units and respective error correction information for the set of encoded data units. The operations of 610 may be performed in accordance with examples as disclosed herein. In some examples, aspects of the operations of 610 may be performed by a decoding component 530 as described with reference to FIG. 5.

At 615, the method may include generating a parity unit associated with encoded representations of the set of data units based at least in part on performing the respective decoding operations. The operations of 615 may be performed in accordance with examples as disclosed herein. In some examples, aspects of the operations of 615 may be performed by a parity generation component 540 as described with reference to FIG. 5.

At 620, the method may include transmitting the parity unit to the memory device. The operations of 620 may be performed in accordance with examples as disclosed herein. In some examples, aspects of the operations of 620 may be performed by a transmission component 545 as described with reference to FIG. 5.

At 625, the method may include transmitting a command to the memory device to write a second subset of the set of data units and the parity unit to a second set of memory cells of the memory device. The operations of 625 may be performed in accordance with examples as disclosed herein. In some examples, aspects of the operations of 625 may be performed by a command transmission component 550 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a controller, a set of encoded data units from a first set of memory cells of a memory device, performing, at the controller, respective decoding operations on the set of encoded data units to obtain a corresponding set of data units and respective error correction information for the set of encoded data units; generating a parity unit associated with encoded representations of the set of data units based at least in part on performing the respective decoding operations, transmitting the parity unit to the memory device; and transmitting a command to the memory device to write a second subset of the set of data units and the parity unit to a second set of memory cells of the memory device.

Aspect 2: The method, apparatus, or non-transitory computer-readable medium of aspect 1, further including operations, features, circuitry, logic, means, or instructions, or any combination thereof for encoding a second subset of the set of data units based at least in part on the respective error correction information for the second subset of the set of data units to obtain one or more reencoded data units and transmitting the one or more reencoded data units to the memory device, where the command is further to write the one or more reencoded data units to the second set of memory cells of the memory device, where the first subset of the data units is exclusive of the second subset of the set of data units.

Aspect 3: The method, apparatus, or non-transitory computer-readable medium of aspect 1 through 2, where transmitting the one or more reencoded data units and the parity unit includes operations, features, circuitry, logic, means, or instructions, or any combination thereof for suppressing transmitting the second subset of the set of data units to the memory device.

Aspect 4: The method, apparatus, or non-transitory computer-readable medium of any of aspects 1 through 3, where the command includes a latch address associated with a subset of a set of latches of the memory device, and the subset of the set of latches corresponds to the first subset of the set of data units.

Aspect 5: The method, apparatus, or non-transitory computer-readable medium of any of aspects 1 through 4, further including operations, features, circuitry, logic, means, or instructions, or any combination thereof for storing, based at least in part on performing the respective decoding operations, the set of data units in a buffer of the controller, where generating the parity unit is based at least in part on the storing.

Aspect 6: The method, apparatus, or non-transitory computer-readable medium of any of aspects 1 through 5, further including operations, features, circuitry, logic, means, or instructions, or any combination thereof for receiving, at the controller, a second set of encoded data units from a third set of memory cells of the memory device; performing, at the controller, respective decoding operations on the second set of encoded data units to obtain a corresponding second set of data units; generating a second parity unit associated with the second set of data units based at least in part on performing the respective decoding operations: transmitting the parity unit to the memory device; and transmitting a second command to the memory device to write the second set of encoded data units and the panty unit to a fourth set of memory cells of the memory device.

Aspect 7: The method, apparatus, or non-transitory computer-readable medium of any of aspects 1 through 6, where a first data unit of the set of data units is associated with a first plane of the first set of memory cells and a second data unit of the set of data units is associated with a second plane of the first set of memory cells different than the first plane.

Aspect 8: The method, apparatus, or non-transitory computer-readable medium of any of aspects 1 through 7, further including operations, features, circuitry, logic, means, or instructions, or any combination thereof for transmitting, to the memory device and as part of a memory management operation to transfer the set of encoded data units from the first set of memory cells to the second set of memory cells, a second command to retrieve the set of encoded data units, where receiving the set of encoded data units is based at least in part on transmitting the second command.

Aspect 9: The method, apparatus, or non-transitory computer-readable medium of any of aspects 1 through 8, further including operations, features, circuitry, logic, means, or instructions, or any combination thereof for determining that the second set of memory cells is associated with a word line of a set of word lines of the memory device, where transmitting the parity unit is based at least in part on the determining.

Aspect 10: The method, apparatus, or non-transitory computer-readable medium of aspect 9, where the set of word lines includes word lines of the memory device not satisfying a performance threshold.

Aspect 11: The method, apparatus, or non-transitory computer-readable medium of any of aspects 1 through 10, where each encoded data unit of the set of encoded data units includes respective parity information associated with a first type of error correction and the parity unit is associated with a second type of error correction different than the first type.

Aspect 12. The method, apparatus, or non-transitory computer-readable medium of any of aspects 1 through 11, where each memory cell of the first set of memory cells stores one bit of data, two bits of data, three bits of data, or four bits of data, and each memory cell of the second set of memory cells stores four bits of data.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials. e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a controller associated with a memory device, wherein the controller is configured to cause the apparatus to:
   receive, at the controller, a set of encoded data units from a first set of memory cells of the memory device;
   perform, at the controller, respective decoding operations on the set of encoded data units to obtain a corresponding set of data units and respective error correction information for the set of encoded data units;
   generate a parity unit associated with encoded representations of the set of data units based at least in part on performing the respective decoding operations;
   transmit the parity unit to the memory device; and
   transmit a command to the memory device to write encoded data units of the set of encoded data units corresponding to a first subset of the set of data units and the parity unit to a second set of memory cells of the memory device.

2. The apparatus of claim 1, wherein the controller is further configured to cause the apparatus to:

encode a second subset of the set of data units based at least in part on respective error correction information for the second subset of the set of data units to obtain one or more reencoded data units; and transmit the one or more reencoded data units to the memory device, wherein the command indicates to write the one or more reencoded data units to the second set of memory cells of the memory device, wherein the first subset of the set of data units is exclusive of the second subset of the set of data units.

3. The apparatus of claim 2, wherein, to transmit the one or more reencoded data units and the parity unit, the controller is configured to cause the apparatus to:

suppress transmitting encoded representations of the first subset of the set of data units to the memory device.

4. The apparatus of claim 1, wherein:

the command comprises a latch address associated with a subset of a set of latches of the memory device; and the subset of the set of latches corresponds to the set of encoded data units.

5. The apparatus of claim 1, wherein the controller is further configured to cause the apparatus to:

store, based at least in part on performing the respective decoding operations, the set of data units in a buffer of the controller, wherein generating the parity unit is based at least in part on the storing.

6. The apparatus of claim 1, wherein the first subset of the set of data units comprises the set of data units.

7. The apparatus of claim 1, wherein a first plurality of data units of the set of data units is associated with a first plane of the first set of memory cells and a second plurality of data units of the set of data units is associated with a second plane of the first set of memory cells different than the first plane.

8. The apparatus of claim 1, wherein the controller is further configured to cause the apparatus to:

transmit, to the memory device and as part of a memory management operation to transfer the set of encoded data units from the first set of memory cells to the second set of memory cells, a second command to retrieve the set of encoded data units, wherein receiving the set of encoded data units is based at least in part on transmitting the second command.

9. The apparatus of claim 1, wherein the controller is further configured to cause the apparatus to:

determine that the second set of memory cells is associated with a word line of a set of word lines of the memory device, wherein transmitting the parity unit is based at least in part on the determining.

10. The apparatus of claim 9, wherein the set of word lines comprises word lines of the memory device not satisfying a performance threshold.

11. The apparatus of claim 1, wherein each encoded data unit of the set of encoded data units comprises respective parity information associated with a first type of error correction and the parity unit is associated with a second type of error correction different than the first type.

12. The apparatus of claim 1, wherein:

each memory cell of the first set of memory cells stores one bit of data, two bits of data, three bits of data, or four bits of data; and each memory cell of the second set of memory cells stores four bits of data.

13. A non-transitory computer-readable medium storing code, the code comprising instructions executable by a processor to:

receive, at a memory controller, a set of encoded data units from a first set of memory cells of a memory device;

perform, at the memory controller, respective decoding operations on the set of encoded data units to obtain a corresponding set of data units and respective error correction information for the set of encoded data units;

generate a parity unit associated with encoded representations of the set of data units based at least in part on performing the respective decoding operations;

transmit the parity unit to the memory device; and transmit a command to the memory device to write encoded data units of the set of encoded data units corresponding to a first subset of the set of data units and the parity unit to a second set of memory cells of the memory device.

14. The non-transitory computer-readable medium of claim 13, wherein the instructions are further executable by the processor to:

encode a second subset of the set of data units based at least in part on respective error correction information for the second subset of the set of data units to obtain one or more reencoded data units; and transmit the one or more reencoded data units to the memory device, wherein the command is further to write the one or more reencoded data units to the second set of memory cells of the memory device, wherein the first subset of the set of data units is exclusive of the second subset of the set of data units.

15. The non-transitory computer-readable medium of claim 14, wherein the instructions to transmit the one or more reencoded data units and the parity unit are executable by the processor to:

suppress transmitting the second subset of the set of data units to the memory device.

16. The non-transitory computer-readable medium of claim 13, wherein:

the command comprises a latch address associated with a subset of a set of latches of the memory device; and the subset of the set of latches corresponds to the first subset of the set of data units.

17. The non-transitory computer-readable medium of claim 13, wherein the instructions are further executable by the processor to:

store, based at least in part on performing the respective decoding operations, the set of data units in a buffer of the memory controller, wherein generating the parity unit is based at least in part on the storing.

18. The non-transitory computer-readable medium of claim 13, wherein the instructions are further executable by the processor to:

receive, at the memory controller, a second set of encoded data units from a third set of memory cells of the memory device;

perform, at the memory controller, respective decoding operations on the second set of encoded data units to obtain a corresponding second set of data units;

generate a second parity unit associated with the second set of data units based at least in part on performing the decoding operations;

transmit the parity unit to the memory device; and transmit a second command to the memory device to write the second set of encoded data units and the parity unit to a fourth set of memory cells of the memory device.

19. The non-transitory computer-readable medium of claim 13, wherein a first data unit of the set of data units is associated with a first plane of the first set of memory cells and a second data unit of the set of data units is associated with a second plane of the first set of memory cells different than the first plane.

20. A method, comprising:

receiving, at a memory controller, a set of encoded data units from a first set of memory cells of a memory device;

performing, at the memory controller, respective decoding operations on the set of encoded data units to obtain a corresponding set of data units and respective error correction information for the set of encoded data units;

generating a parity unit associated with encoded representations of the set of data units based at least in part on performing the respective decoding operations;

transmitting the parity unit to the memory device; and transmitting a command to the memory device to write encoded data units of the set of encoded data units corresponding to a first subset of the set of data units and the parity unit to a second set of memory cells of the memory device.

* * * * *